United States Patent
Chapman

Patent Number: 6,131,833
Date of Patent: Oct. 17, 2000

[54] TRACKED DRIVE TOWER FOR A SELF-PROPELLED IRRIGATION SYSTEM

[75] Inventor: John A. Chapman, Wahoo, Nebr.

[73] Assignee: Valmont Industries, Inc., Valley, Nebr.

[21] Appl. No.: 09/114,018

[22] Filed: Jul. 10, 1998

[51] Int. Cl.⁷ .................................................. B05B 3/00
[52] U.S. Cl. ........................ 239/728; 239/735; 305/199; 305/178; 305/128; 305/168; 305/195
[58] Field of Search .................................. 239/728, 734, 239/735, 741, 750, 751, 737, 736; 305/135, 195, 199, 124, 128, 132, 133, 134, 138, 160, 168, 34, 178

[56] References Cited

U.S. PATENT DOCUMENTS

| | | | |
|---|---|---|---|
| 2,429,242 | 10/1947 | Slemmons | 305/10 |
| 2,711,615 | 6/1955 | Boice, Jr. | 47/1 |
| 2,931,579 | 4/1960 | Ruddell | 239/179 |
| 3,118,709 | 1/1964 | Case | 305/37 |
| 3,281,081 | 10/1966 | Purtell | 239/213 |
| 3,472,563 | 10/1969 | Irgens | 305/195 |
| 3,498,314 | 3/1970 | Gheen | 239/737 |
| 3,545,478 | 12/1970 | Etgen | 239/737 |
| 3,680,925 | 8/1972 | Spivy | 305/168 |
| 3,720,277 | 3/1973 | Masaoka | 305/128 |
| 3,771,719 | 11/1973 | Raso et al. | 239/728 |
| 3,848,936 | 11/1974 | Tsuchiya et al. | 305/35 EB |
| 3,948,110 | 4/1976 | Lassanske | 305/178 |
| 4,278,303 | 7/1981 | Livesay | 305/199 |
| 4,429,898 | 2/1984 | Bedenbender et al. | 305/34 |
| 5,078,326 | 1/1992 | Wright | 239/737 |
| 5,190,363 | 3/1993 | Brittain et al. | 305/199 |
| 5,505,386 | 4/1996 | Stone | 239/728 |

FOREIGN PATENT DOCUMENTS

| | | |
|---|---|---|
| 291021 | 7/1967 | Australia . |
| 293781 | 7/1967 | Australia . |

*Primary Examiner*—Andres Kashnikow
*Assistant Examiner*—Dinh Q. Nguyen
*Attorney, Agent, or Firm*—Zarley, McKee, Thomte Voorhees & Sease; Dennis L. Thomte

[57] ABSTRACT

A drive tower for a self-propelled irrigation system is described which is of the track type. The drive tower includes an elongated frame having opposite ends. A drive pulley is mounted at one end of the frame while a tail pulley is mounted at the other end of the frame. The drive pulley comprises a pair of spaced-apart, disc-shaped plates having spaced-apart rods secured thereto and extending therebetween at the periphery thereof for engagement with the interior surface of the belt. The interior surface of the traction belt is provided with a plurality of longitudinally spaced-apart lugs which are received between the rods on the drive wheel. The tail pulley and the idler pulleys have peripheries which receive the lugs on the inner surface of the belt. The exterior surface of the belt is also provided with a plurality of transversely extending traction lugs. The belt is driven by means of a double reduction gear drive.

20 Claims, 5 Drawing Sheets

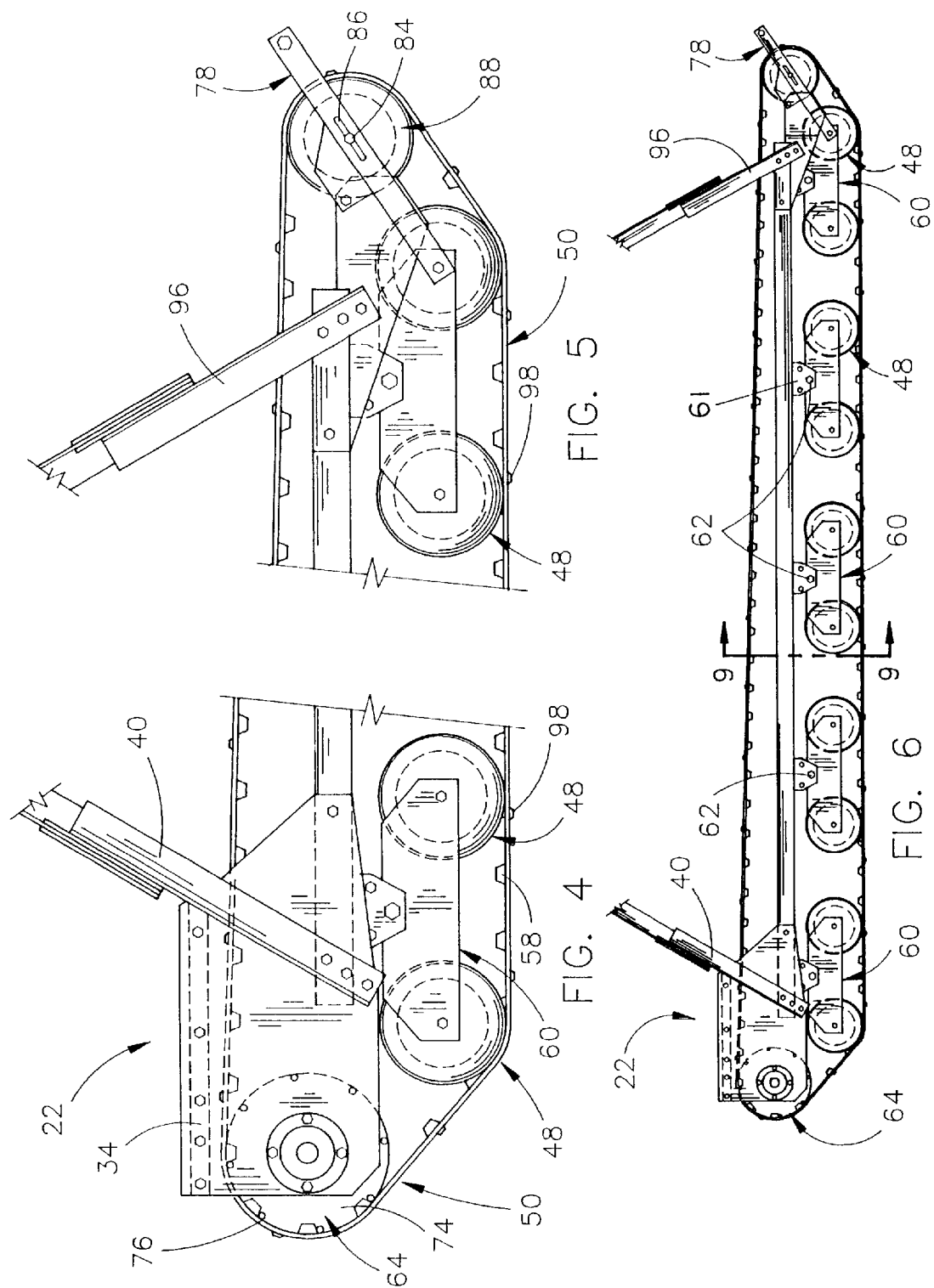

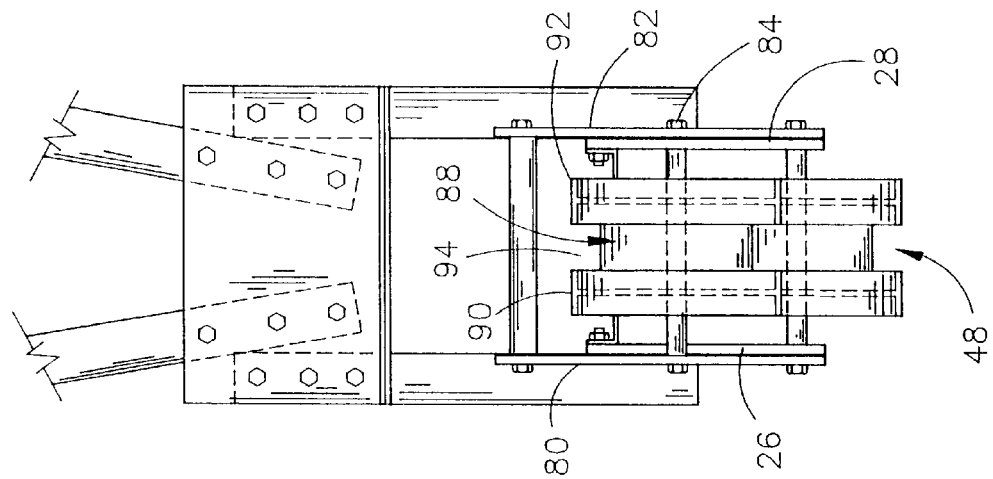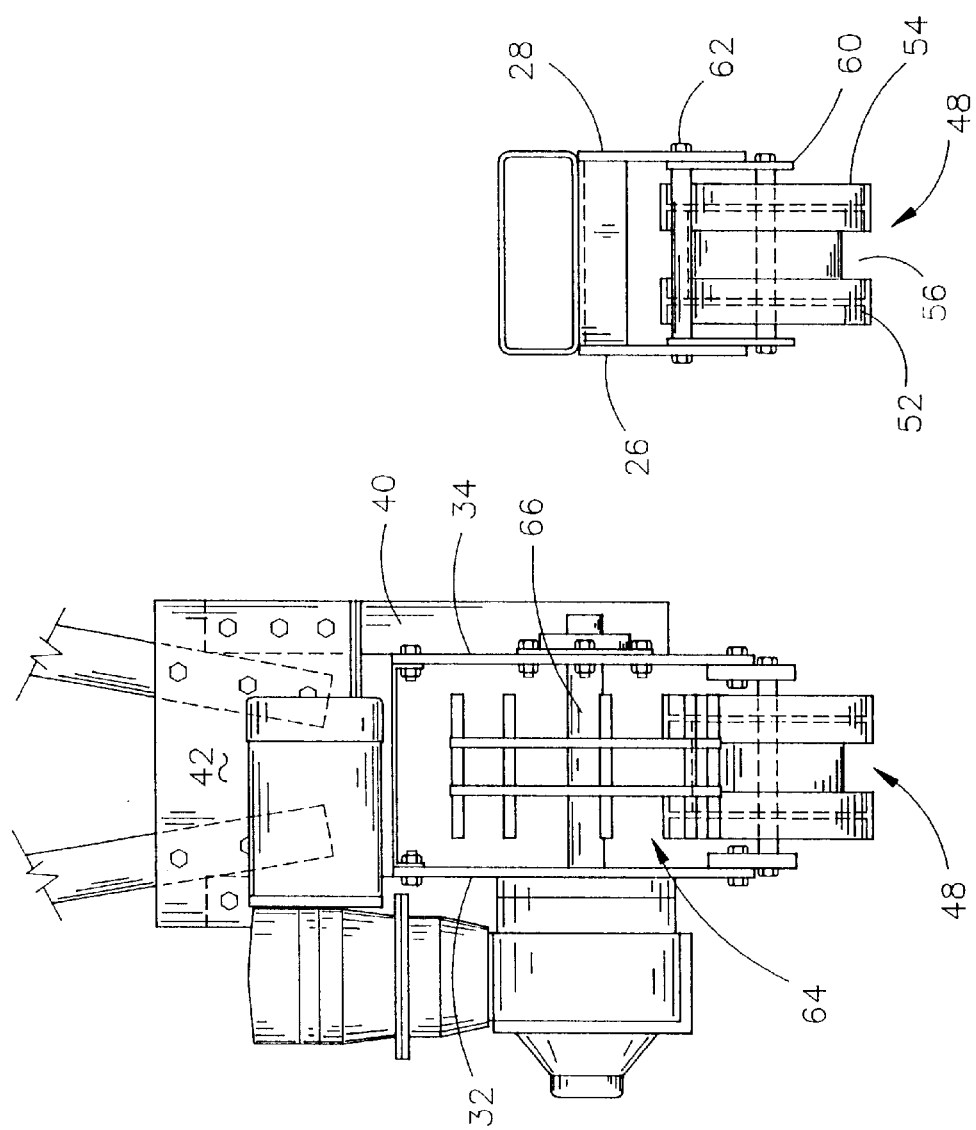

TRACKED DRIVE TOWER FOR A SELF-PROPELLED IRRIGATION SYSTEM

BACKGROUND OF THE INVENTION

1. Field of the Invention

This invention relates to a drive tower for a self-propelled irrigation system such as a center pivot or linear move irrigation system and more particularly to a tracked drive tower for those irrigation systems.

2. Description of the Related Art

Self-propelled irrigation systems such as center pivot and linear move systems normally employ a plurality of wheeled drive towers which support and propel the irrigation pipe over the area to be irrigated. The wheels of the drive towers frequently create deep wheel tracks in the field. Further, in some situations, the drive wheels slip and are unable to propel the irrigation system. In an attempt to solve the problems associated with wheeled drive towers, there have been some attempts at providing a drive tower wherein the same is propelled by an endless track much like a tank track or crawler tractor type. One such system is disclosed in U.S. Pat. No. 5,078,326. Other tracked-type systems for drive towers for irrigation systems are found in certain of the prior art cited during the prosecution of the above-identified patent.

Although tracked drive towers have been previously provided, it is believed that the tracked drive towers of the prior art suffer from certain disadvantages. It is believed that certain of the prior art devices suffer slippage between the drive wheels or track pulleys and the endless track. Further, it is believed that certain of the tracked drive towers of the prior art are overly complicated. Still another disadvantage of the prior art systems is that the belts wear readily due to the means of driving the same.

SUMMARY OF THE INVENTION

A drive tower for a self-propelled irrigation system is disclosed wherein an endless track is utilized rather than a pair of pneumatic drive wheels. The tracked drive tower of this invention comprises an elongated tubular frame. A first drive pulley is rotatably mounted, about a horizontal axis, at one end of the tubular frame. A double reduction gear drive is operatively connected to the first drive pulley for rotatably driving the first drive pulley. A second pulley is rotatably mounted, about a horizontal axis, at the other end of the tubular frame. A plurality of idler pulleys mounted on walking beams are secured to and positioned beneath the tubular frame between the first drive pulley and the second pulley. An endless traction belt extends around the first drive pulley, the second pulley and the idler pulleys whereby rotation of the first drive pulley by the gear drive will cause the traction belt to propel the drive tower and move the irrigation pipe over the area to be irrigated. The inner surface of the traction belt has a plurality of longitudinally spaced-apart lugs protruding therefrom along the centerline thereof. The traction belt also has a plurality of spaced-apart traction lugs provided on the outer surface thereof with those lugs being disposed transversely with respect to the direction of movement of the traction belt. The first drive pulley comprises a pair of vertically disposed, horizontally spaced-apart disc-shaped plate members having a central axle extending therethrough. The distance between the disc-shaped plate members is less than the width of the traction belt. A plurality of spaced-apart rods are secured to and extend between the plate members at the periphery thereof and extend transversely outwardly from the plate members for engagement with the interior surface of the traction belt. The rods are sufficiently spaced-apart to permit the lugs of the traction belt to be received therebetween. An irrigation pipe support structure extends upwardly from the frame for supporting the irrigation pipe thereon.

It is therefore a principal object of the invention to provide an improved drive tower for a self-propelled irrigation system.

Still another object of the invention is to provide a tracked drive tower for a self-propelled irrigation system.

Still another object of the invention is to provide a tracked drive tower for a self-propelled irrigation system which includes a novel drive pulley and a novel tail pulley.

Yet another object of the invention is to provide a tracked drive tower for a self-propelled irrigation system wherein the inner surface of the endless traction belt is provided with a plurality of longitudinally spaced-apart lugs which protrude from the traction belt along the centerline thereof.

Still another object of the invention is to provide a tracked drive tower for a self-propelled irrigation system which is durable in use.

These and other objects will be apparent to those skilled in the art.

BRIEF DESCRIPTION OF THE DRAWINGS

FIG. 4 is a partial side elevational view of one end of the tracked drive tower of this invention;

FIG. 5 is a partial side elevational view of the other end of the tracked drive tower;

FIG. 6 is a side elevational view of the tracked drive tower;

FIG. 8 is an end elevational view of the drive tower of this invention with the endless track removed therefrom;

FIG. 9 is a sectional view seen on lines 9—9 of FIG. 6 with the endless belt removed; and FIG. 10 is an end elevational view of the tail pulley.

DESCRIPTION OF THE PREFERRED EMBODIMENT

Figure 1:
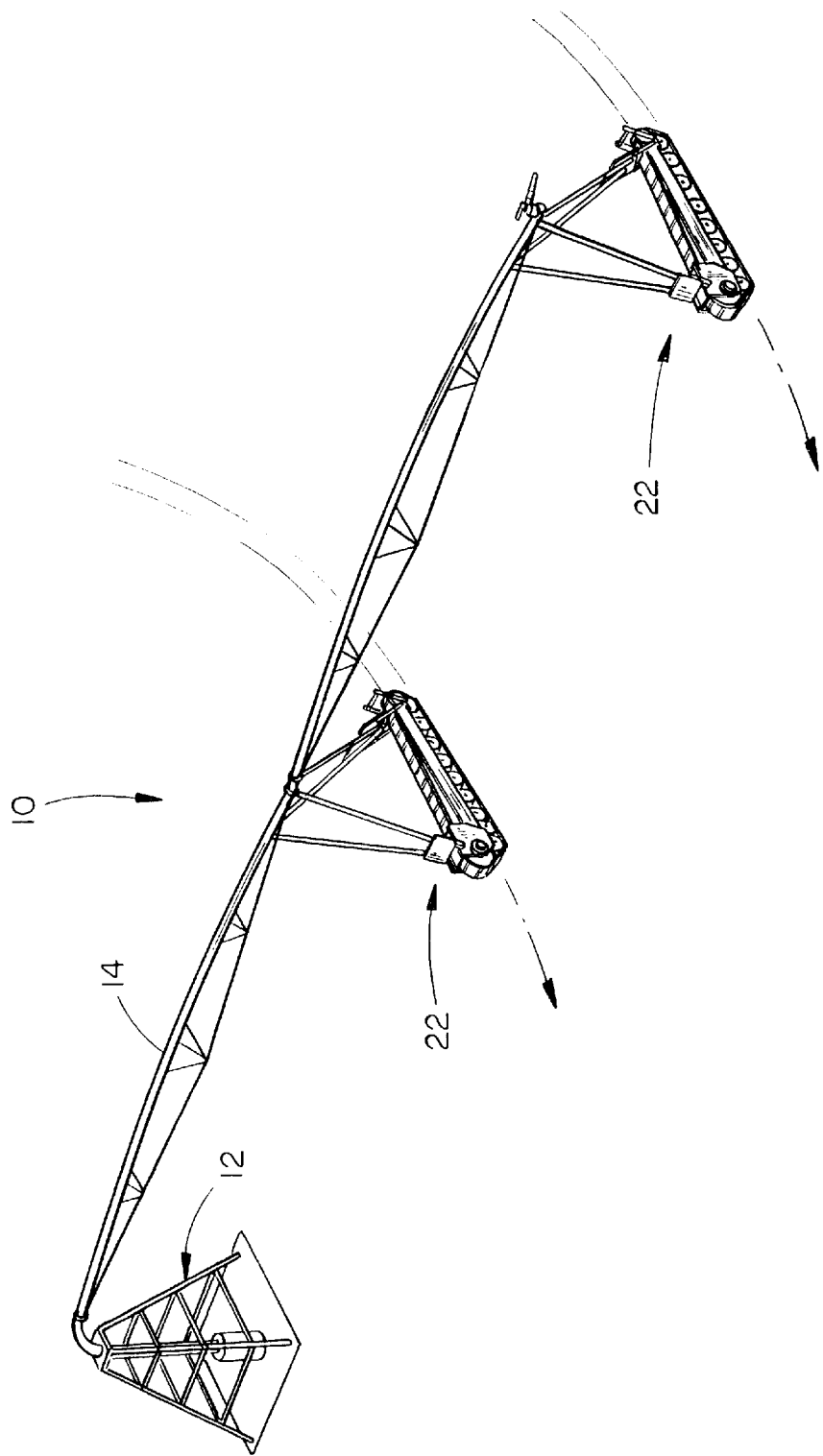
FIG. 1 is a perspective view of a center pivot irrigation system having the tracked drive towers of this invention.
Figure 3:
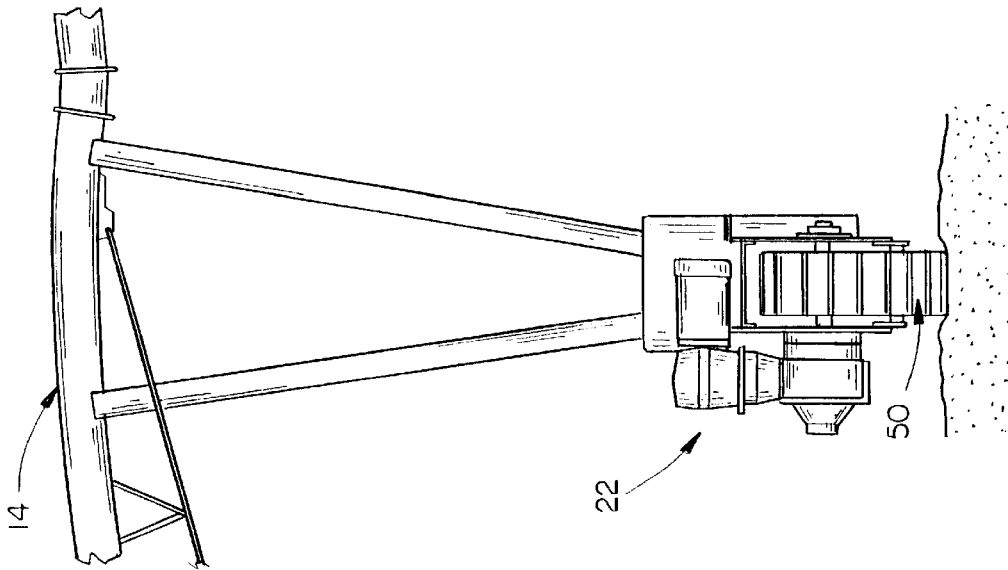
FIG. 3 is an end view of the tracked drive tower of this invention.
Figure 2:
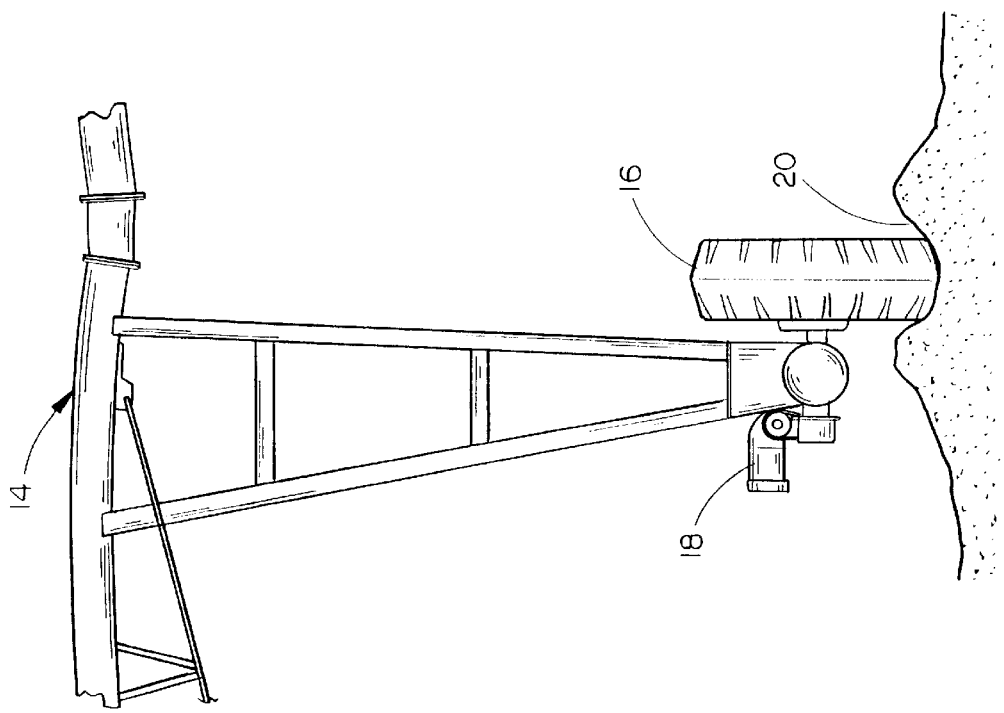
FIG. 2 is an end view of a prior art drive tower.
Figure 7:
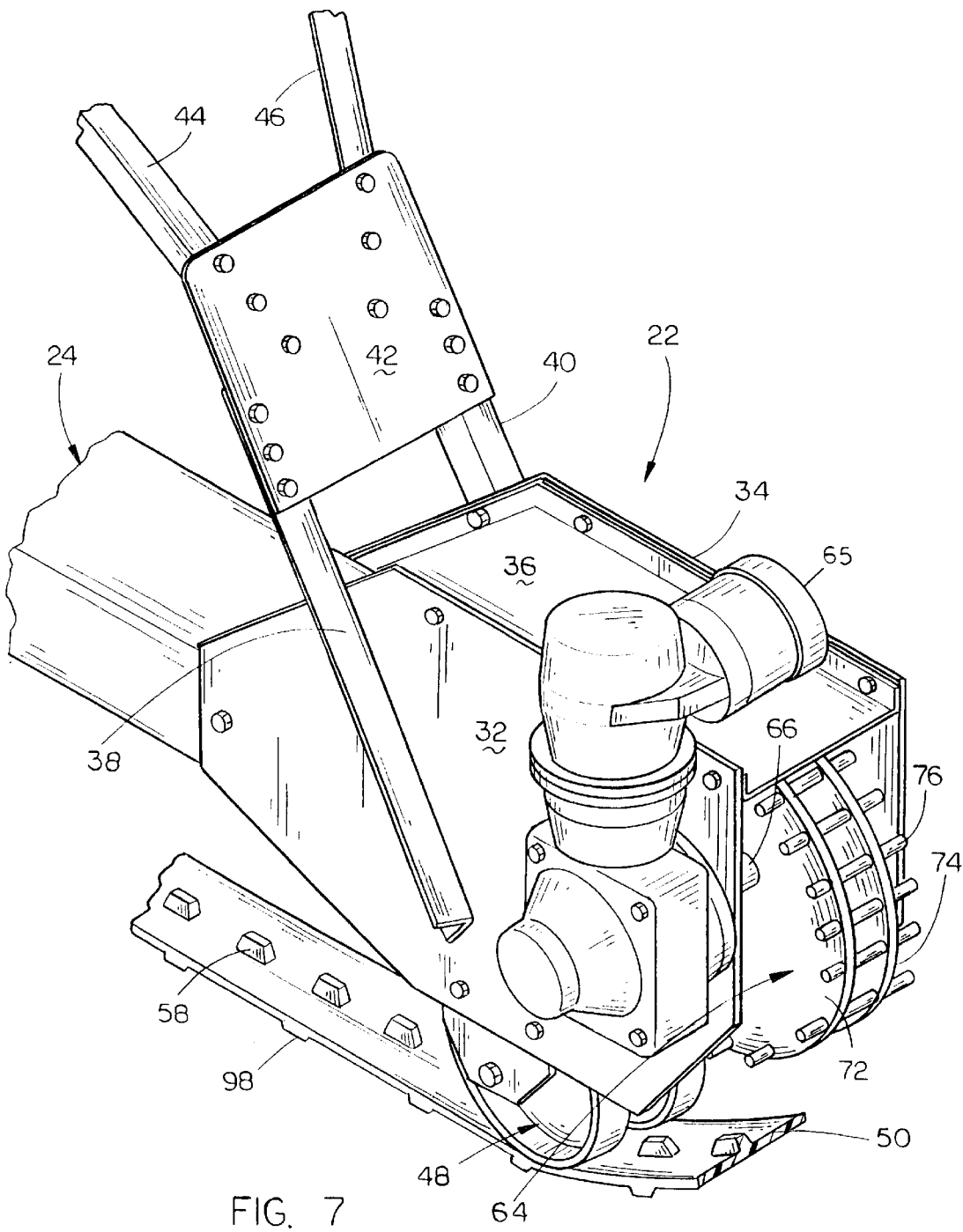
FIG. 7 is a partial perspective view of one end of the drive tower of this invention.

The numeral 10 refers generally to a center pivot irrigation system including a center pivot structure 12 and a main water conduit 14 extending outwardly therefrom. FIG. 2 illustrates a conventional drive tower of the prior art which includes a pair of drive wheels 16 driven by a motor 18 in conventional fashion. As seen in FIG. 2, the drive wheels 16 create wheel tracks or ruts referred to generally the reference numeral 20. Although FIG. 1 illustrates that the irrigation system has two drive towers, it should be understood that any number of drive towers could be employed. Further, it should be noted that sprinklers are provided on the main water conduit 14 in conventional fashion. FIG. 1 illustrates the drive tower of this invention which is referred to generally by the reference numeral 22. Drive tower 22 includes a tubular frame referred to generally by the reference numeral 24. Frame 24 is preferably comprised of a 4"×10" tube constructed from 7 gage steel. Plates 32 and 34 are secured to one end of frame 24 and have a top plate or cover 36 secured thereto and extending therebetween. Tower braces 38 and 40 are secured to plates 32 and 34 and extend upwardly to plate 42 to which they are bolted or otherwise secured. Tower arms 44 and 46 are secured to plate 42 and extend upwardly therefrom to support the irrigation pipe in conventional fashion.

A plurality of idler wheel assemblies 48 are secured to and are positioned below frame 24 for engagement with the interior surface of the endless track 50. As best seen in FIGS. 6 and 9, each of the idler wheel assemblies 48 includes a pair of horizontally spaced-apart idler wheels 52 and 54 which define a recessed portion 56 therebetween adapted to receive the lugs 58 which protrude from the inner surface of the endless belt 50 in a longitudinally spaced-apart manner along the centerline of the belt 50.

It is preferred that the idler wheel assemblies 48 be of the walking beam type. As seen in FIG. 6, a generally horizontally disposed beam 60 is pivotally mounted on bracket 61, which is secured to frame 24 by welding or the like, by means of shaft 62. Pairs of idler wheels are rotatably mounted on opposite ends of frame 24. The walking beam construction of the idler wheel assemblies 48 enables the idler wheels to be constructed from a low cost plastic material. If plastic idler wheels were rigidly mounted, they would possibly fail as the tower crossed rigid objects, such as rocks or the like.

The numeral 64 refers to a drive pulley which is mounted on axle 66 which is rotatably mounted on the plates 32 and 34, as best seen in FIG. 8. A double reduction gear motor 65 is connected to axle 66 to drive the same. Drive pulley 64 is comprised of a pair of vertically disposed, horizontally spaced-apart disc-shaped plates 72 and 74 which are mounted on the axle 66 for rotation therewith and which have a plurality of spaced-apart rods 76 mounted in the peripheries thereof which protrude transversely outwardly from the plates 72 and 74 for engagement with the inside surface of the track or belt 50. The rods 76 are spaced-apart a sufficient distance to enable at least one of the lugs 58 to be received therebetween. Rotation of the drive pulley 64 causes the rods 76 to engage the lugs 58 to positively apply driving force to the endless belt 50. A belt tensioning apparatus is provided on the other end of the frame means and is referred to generally by the reference numeral 78. Belt tensioning apparatus 78 includes a pair of arms 80 and 82 which are secured at their lower ends to the side frame members 26 and 28. Axle 84 is longitudinally received by elongated slots formed in the arms 80 and 82. As seen in FIG. 5, the slot formed in arm 80 is referred to generally by the reference numeral 86. The numeral 88 refers generally to a pulley which is mounted on axle 84 for rotation therewith and which is sometimes referred to as a tail pulley. Pulley 88 is comprised of a pair of pulley wheel members 90 and 92 which are spaced-apart, as illustrated in FIG. 10, to define a recess 94 therebetween adapted to receive the lugs 58 therein. Pulley 88 may be raised or lowered on the arms 80 and 82 to either tighten or loosen the tension in the belt 50. Braces extend upwardly from side frame members 26 and 28, as seen in FIG. 5, and are referred to generally by the reference numeral 96. Braces 96 are connected to the irrigation pipe to support the same in conventional fashion.

Belt 50 is preferably constructed of a suitable plastic or rubber material and has the lugs 58 extending on the inside surface thereof as previously described. Additionally, the exterior surface of belt 50 is provided with a plurality of transversely extending traction lugs 98.

Actuation of the gear motor 65 causes the drive pulley 64 to rotate so that the rods 76 engage the lugs 58 to positively propel the belt 50. Not only do the rods 76 provide engagement surfaces for the lugs 58, but the outer ends thereof serve to support the belt without undue wear thereof. The interaction between the rods 76 and the lugs 58 ensures that there will not be any slippage between the drive pulley and the belt.

The tracked drive tower of this invention is very stable in use and will not create deep wheel tracks or ruts unless unusual circumstances arise. The track 50 engages the ground over a wide area and ensures that there will be sufficient traction between the belt and the ground to propel the drive tower over the area to be irrigated.

The steel beam or frame 24 adds the sufficient strength to the assembly which is required as the towers move through the field.

Thus it can be seen that the invention accomplishes at least all of its stated objectives.

I claim:

1. A drive tower for a self-propelled irrigation system, comprising:

an elongated, generally horizontally disposed frame having opposite ends;

a first drive pulley rotatably mounted, about a horizontal axis, at one end of said frame;

a drive motor for rotatably driving said first drive pulley;

a second pulley rotatably mounted, about a horizontal axis, at the other end of said frame;

a plurality of idler assemblies secured to said frame, between said ends of said frame between said first drive pulley and said second pulley;

an endless traction belt extending around said first drive pulley, said second pulley, and said idler assemblies;

said traction belt having inner and outer surfaces;

said inner surface of said traction belt having a plurality of longitudinally spaced-apart lugs extending therefrom along the center line thereof;

said first drive pulley comprising a pair of vertically disposed, horizontally spaced-apart plate members;

the distance between said plate members being less than the width of said traction belt;

a plurality of spaced-apart rods secured to and extending between said plate members at the periphery thereof and extending outwardly from said plate members for engagement with the interior surface of said traction belt;

said rods being sufficiently spaced-apart to permit at least one of said lugs of said traction belt to be received therebetween;

and an irrigation pipe support means extending upwardly from said frame means for supporting an irrigation pipe thereon.

2. The combination of claim 1 wherein said traction belt has a plurality of spaced-apart traction lugs provided on the outer surface thereof, said lugs being disposed transversely with respect to the direction of movement of said traction belt.

3. The combination of claim 1 wherein a belt tensioning means is associated with said second pulley.

4. The drive tower of claim 1 wherein said second pulley has an annular recess formed in the periphery thereof for receiving said lugs therein.

5. The drive tower of claim 1 wherein said second pulley comprises a pair of horizontally spaced-apart pulley wheel members having a central space therebetween for receiving said lugs therein.

6. The drive tower of claim 1 wherein said frame comprises a steel tube.

7. The drive tower of claim 6 wherein said steel tube has a rectangular cross section.

8. The drive tower of claim 1 wherein said idler assemblies are of the walking beam type.

9. The drive tower of claim 1 wherein said idler assemblies are positioned beneath said frame.

10. The drive tower of claim 1 wherein said drive motor comprises a double reduction gear drive motor.

11. A drive tower for a self-propelled irrigation system, comprising:

a frame having opposite ends;

a first drive pulley rotatably mounted, about a horizontal axis, at one end of said frame;

a drive motor for rotatably driving said first drive pulley;

a second pulley rotatably mounted, about a horizontal axis, at the other end of said frame means;

a plurality of idler assemblies secured to said frame between said first drive pulley and said second pulley;

an endless traction belt extending around said first drive pulley, said second pulley, and said idler assemblies;

said traction belt having inner and outer surfaces;

said inner surface of said traction belt having a plurality of longitudinally spaced-apart lugs extending therefrom along the center line thereof;

said first drive pulley comprising a pair of vertically disposed, horizontally spaced-apart disc-shaped plate members;

track engagers mounted on said plate members for engaging the inside surface of said traction belt;

and irrigation pipe support means extending upwardly from said frame means for supporting an irrigation pipe thereon.

12. The combination of claim 11 wherein said traction belt has a plurality of spaced-apart traction lugs provided on the outer surface thereof, said lugs being disposed transversely with respect to the direction of movement of said traction belt.

13. The combination of claim 11 wherein belt tensioning means is associated with said second pulley.

14. The drive tower of claim 11 wherein said second pulley has an annular recess formed in the periphery thereof for receiving said lugs therein.

15. The drive tower of claim 11 wherein said second pulley comprises a pair of horizontally spaced-apart pulley wheel members having a central space therebetween for receiving said lugs.

16. The drive tower of claim 11 wherein said frame comprises a steel tube.

17. The drive tower of claim 11 wherein said steel tube has a rectangular cross section.

18. The drive tower of claim 11 wherein said idler assemblies are of the walking beam type.

19. The drive tower of claim 11 wherein said idler assemblies are positioned beneath said frame.

20. The drive tower of claim 11 wherein said drive motor comprises a double reduction gear drive motor.

* * * * *